W. KOSIBA.
VEHICLE SIGNAL.
APPLICATION FILED FEB. 11, 1918.

1,283,805.

Patented Nov. 5, 1918.
3 SHEETS—SHEET 1.

INVENTOR
Wojciech Kosiba
BY Oscar Geier
ATTORNEY

W. KOSIBA.
VEHICLE SIGNAL.
APPLICATION FILED FEB. 11, 1918.
1,283,805. Patented Nov. 5, 1918.
3 SHEETS—SHEET 2.
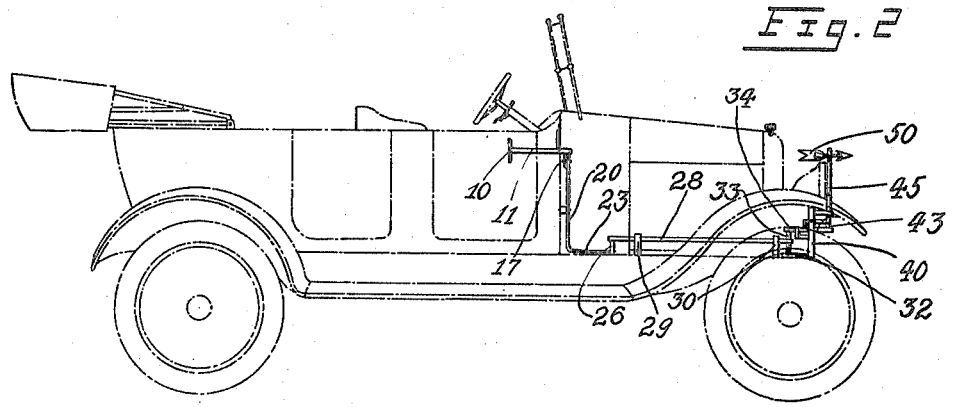
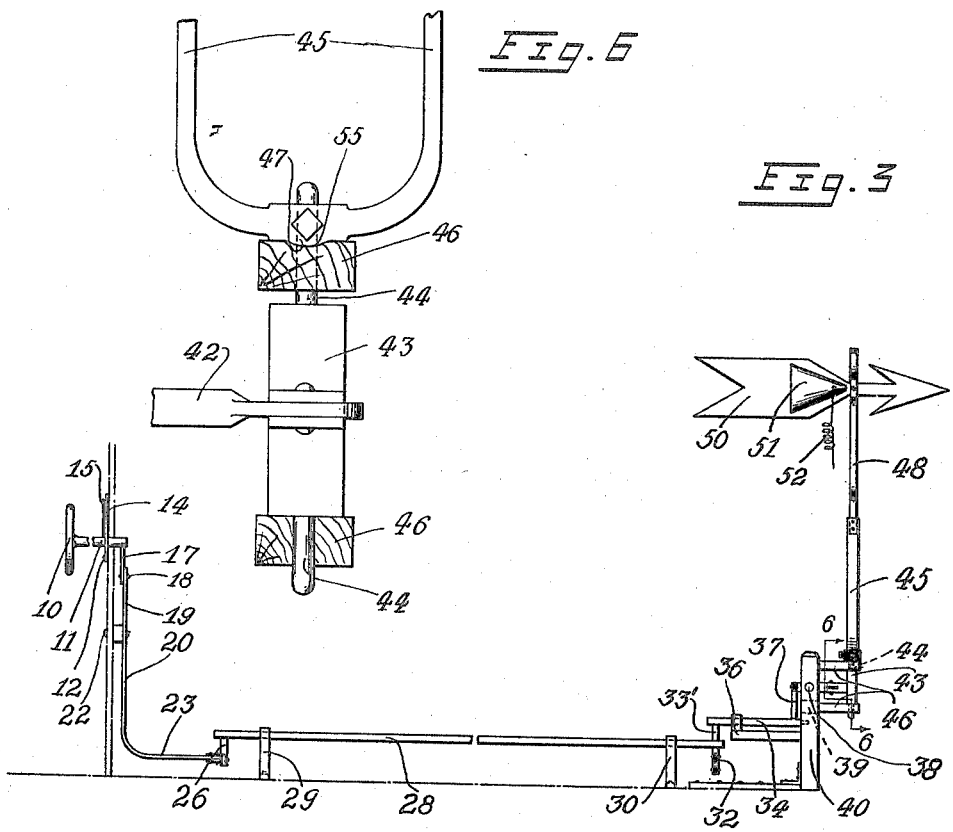
INVENTOR
Wojciech Kosiba
BY
ATTORNEY W. KOSIBA.
VEHICLE SIGNAL.
APPLICATION FILED FEB. 11, 1918.
1,283,805.
Patented Nov. 5, 1918.
3 SHEETS—SHEET 3.
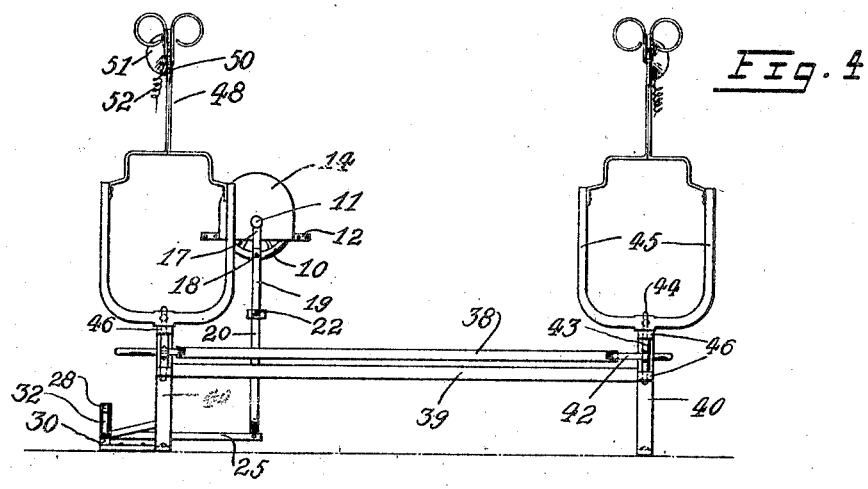
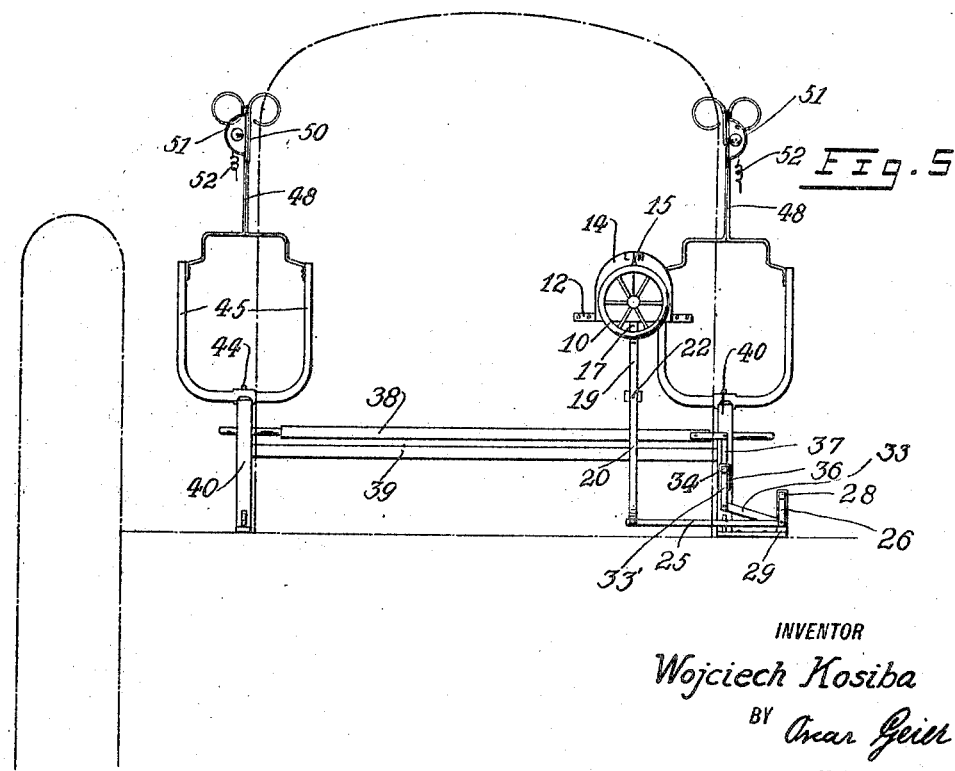
INVENTOR
Wojciech Kosiba
BY Oscar Geist
ATTORNEY

UNITED STATES PATENT OFFICE.

WOJCIECH KOSIBA, OF NORTHBRIDGE, MASSACHUSETTS.

VEHICLE-SIGNAL.

1,283,805.　　　　　Specification of Letters Patent.　　Patented Nov. 5, 1918.

Application filed February 11, 1918. Serial No. 216,464.

*To all whom it may concern:*

Be it known that I, WOJCIECH KOSIBA, a subject of the Emperor of Austria, resident of Northbridge, county of Worcester, and State of Massachusetts, have invented certain new and useful Improvements in Vehicle-Signals, of which the following is a specification.

This invention relates to improvements in vehicle signals whereby a turning movement is indicated by the operator of the vehicle in such manner as to clearly show in which direction the car is about to turn.

The principal object of the invention is to provide a device which will cause the lights of the vehicle to illuminate the path over which the car is about to travel and also to show in the day-time, by means of signals, a similar intention of turning.

A further object is to provide such devices in forms which may be readily applied to cars of existing construction as well as installed during their manufacture, and finally to provide a device which is readily operated in an easy and positive manner.

These and other like objects are attained by the novel construction and combination of parts hereinafter described and shown in the accompanying drawings, forming a material part of this disclosure, and in which:—

Fig. 2 is a side elevational view of the same.

Fig. 3 is a side elevational view of the signal device.

Fig. 4 is a front elevational view of the same.

Fig. 5 is a rear elevational view, and

Fig. 6 is an enlarged fragmental vertical sectional view taken on line 6—6 of Fig. 3.

Figure 1:
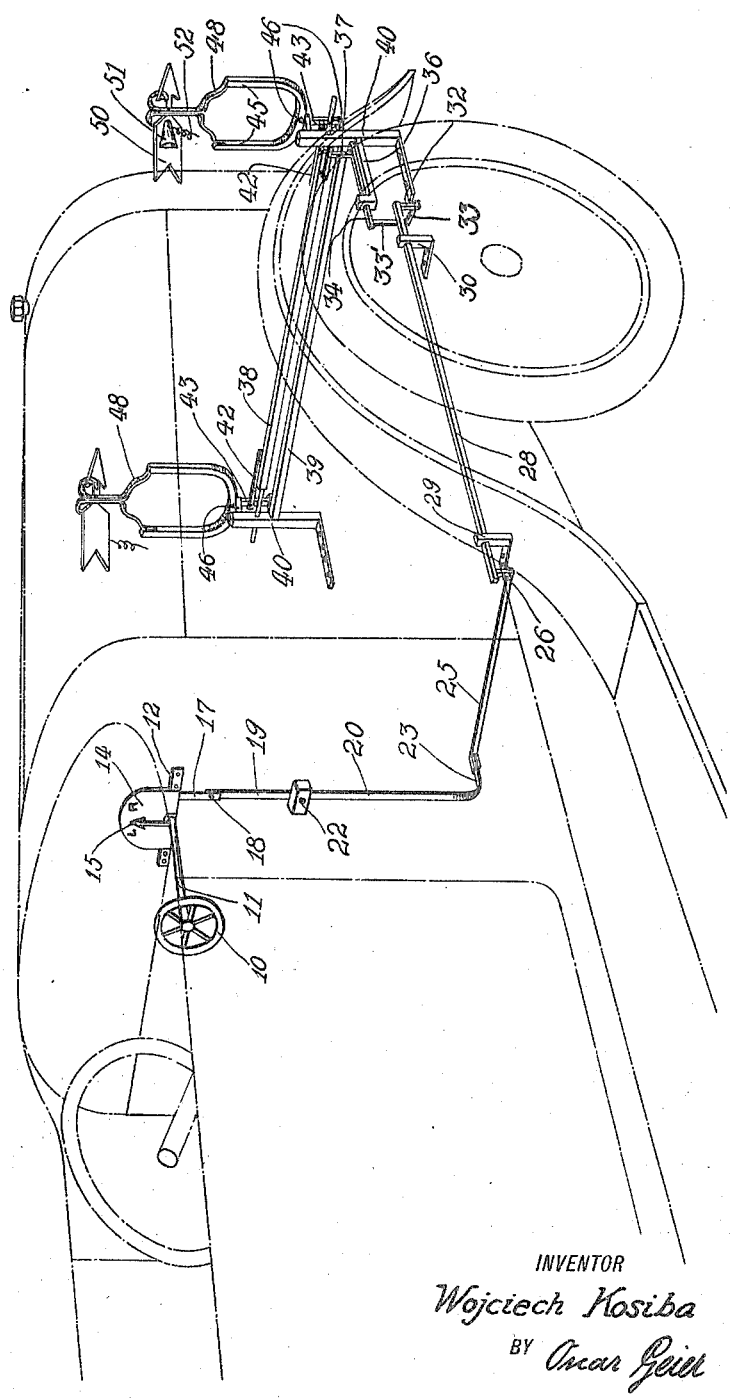
Figure 1 is a perspective view indicating the application of the invention to a car of conventional type.

The apparatus consists of a control handle, here indicated as a hand-wheel 10, fixed upon the end of a horizontal shaft 11, rotatably mounted in a bracket 12, fixed within the car to the dash-board or like part convenient to the operator.

Secured on this bracket is an index plate 14, bearing characters to represent the direction which the vehicle is to take, the same being indicated by an index hand 15, secured to the shaft 11, while upon the opposite sides of the plate 14, engaged with the shaft 11, is a pendant lever 17, pivotally attached by the pin 18, to the upper end 19, of a lever 20, pivoted in the bracket 22, and having its lower end 23, bent outwardly at an angle and pivotally connected with a link 25, extending outward to the side of the vehicle where it is engaged with an arm 26, rigidly attached to a shaft 28, journaled in brackets 29 and 30, secured to the vehicle in such manner as not to interfere with its usual function.

The shaft 28 has at its opposite or front end another lever 32, pivotally engaged with links 33, and 33' connected with a spindle 34, mounted in the bracket 36, and having engaged at its outer end an arm 37, operatively connected with a sliding rod 38, mounted in a pair of oppositely disposed brackets 40, attached upon either side of the car, so that the shaft 38, can move freely lengthwise therein.

Engaged with the shaft 38, are levers 42, the outer ends of which are connected with brackets 43, to which are secured spindles 44, which carry the lamp frames 45, their forks being engaged at their upper ends by yokes 48, the converging elements of which carry arrows 50, which turn with the lamp frame and may have upon their sides incandescent lamps 51, connected by wires 52, with any suitable source of electrical energy carried by the car.

The spindles 44 are mounted in brackets 46, so as to turn therein and also moved vertically a small amount, due to the raised lugs 47, formed with the hub or lower end of the lamp frames 45, the lugs resting in the recess 55 formed in the upper support elements 46, so that, due to the weight of the lamp and its support, the lug 47, is forced, by gravity into the recess, tending to maintain the lamp directed forward in advance of the car. Thus sufficient power must be exercised by operating the hand-wheel 10, to move the frame out of its position in order to divert them angularly with respect to the direction the car is taking.

In operation, the parts having been assembled with any type of car as indicated and it is desired to turn in either direction the hand-wheel 10, which will be operated accordingly, whereupon both of the lamps are turned simultaneously in the direction in which the operator is supposed to turn the car, while upon slightly releasing the hand-wheel 10, the lugs 47 will engage in the recesses 55, bringing both of the lamps back into their original position.

Having thus described my invention what I claim as new and desire to secure by Letters Patent, is:

The combination with a vehicle frame and car body, of a headlight mechanism, comprising an operating lever within convenient reach of the operator, a vertical rod secured to the body and adapted to be operated by said lever, a pair of oppositely disposed brackets attached to either side of the car, a sliding rod mounted in said brackets for free lengthwise movement, connections between said sliding rod and said vertical rod mounted so as to avoid interference with the functions of the vehicle drive, levers engaged with said sliding rod, brackets connected to the outer ends of said levers, spindles mounted in said brackets so as to turn therein and execute a limited vertical movement, lamp frames carried by said spindles and lugs formed with the lower end of said lamp frames, said lugs finding a seat in recesses of said frames, substantially as described and for the purpose set forth.

In testimony whereof I have affixed my signature.

WOJCIECH KOSIBA.

Copies of this patent may be obtained for five cents each, by addressing the "Commissioner of Patents, Washington, D. C."